(12) United States Patent
Cha et al.

(10) Patent No.: US 11,605,505 B2
(45) Date of Patent: *Mar. 14, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Kyoung Jin Cha, Suwon-si (KR); Hyung Soon Kwon, Suwon-si (KR); Ji Hong Jo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 62 days.

This patent is subject to a terminal disclaimer.

(21) Appl. No.: 17/091,383

(22) Filed: Nov. 6, 2020

(65) Prior Publication Data

US 2021/0057164 A1 Feb. 25, 2021

Related U.S. Application Data

(63) Continuation of application No. 16/877,681, filed on May 19, 2020, now Pat. No. 10,847,321, which is a continuation of application No. 16/158,162, filed on Oct. 11, 2018, now Pat. No. 10,692,654.

(30) Foreign Application Priority Data

Aug. 16, 2018 (KR) .................. 10-2018-0095349

(51) Int. Cl.
*H01G 4/30* (2006.01)
*H01G 4/12* (2006.01)
*H01G 4/008* (2006.01)

(52) U.S. Cl.
CPC ............ *H01G 4/30* (2013.01); *H01G 4/008* (2013.01); *H01G 4/1227* (2013.01)

(58) Field of Classification Search
CPC ........ H01G 4/30; H01G 4/012; H01G 4/1227; H01G 4/2325; H01G 4/008
See application file for complete search history.

(56) References Cited

U.S. PATENT DOCUMENTS 9,087,639 B2 * 7/2015 Kim .................. H01G 4/30
10,692,654 B2 * 6/2020 Cha .................. H01G 4/30
(Continued)

FOREIGN PATENT DOCUMENTS

CN 103456493 A 12/2013
CN 104837580 A 8/2015
(Continued)

OTHER PUBLICATIONS

Chinese Office Action dated Jan. 11, 2022, issued in corresponding Chinese Patent Application No. 201811485701.3 (with English translation).
(Continued)

*Primary Examiner* — Michael P McFadden
(74) *Attorney, Agent, or Firm* — Morgan, Lewis & Bockius LLP

(57) ABSTRACT

A multilayer ceramic electronic component includes a body including an internal electrode alternately arranged with a dielectric layer; and an external electrode disposed on the body and connected to the internal electrode. The internal electrode includes a plurality of nickel (Ni) grains, and a composite layer including tin (Sn) and nickel (Ni) is disposed at a grain boundary of the nickel (Ni) grains.

32 Claims, 6 Drawing Sheets

A

(56) References Cited

U.S. PATENT DOCUMENTS

| | | | |
|---|---|---|---|
| 2012/0288724 A1* | 11/2012 | Ogawa | C23C 26/00 428/457 |
| 2013/0049532 A1* | 2/2013 | Kim | H01C 7/18 361/321.1 |
| 2013/0286539 A1* | 10/2013 | Kim | H01G 13/006 264/615 |
| 2013/0321979 A1 | 12/2013 | Park et al. | |
| 2014/0240898 A1* | 8/2014 | Kim | H01G 4/012 156/89.12 |
| 2014/0321025 A1* | 10/2014 | Saito | H01G 4/232 205/181 |
| 2015/0155098 A1 | 6/2015 | Yamaguchi et al. | |
| 2016/0230026 A1 | 8/2016 | Furusawa | |
| 2018/0130601 A1 | 5/2018 | Kim et al. | |
| 2019/0172641 A1 | 6/2019 | Kim et al. | |
| 2019/0392991 A1* | 12/2019 | Harada | H01G 4/232 |

FOREIGN PATENT DOCUMENTS

| | | |
|---|---|---|
| CN | 105612014 A | 5/2016 |
| CN | 108063051 A | 5/2018 |
| EP | 3 034 202 A1 | 6/2016 |
| FR | 1491074 A | 8/1967 |
| FR | 1583867 A | 12/1969 |
| JP | 5515424 A | 2/1980 |
| JP | 2011-151089 A | 8/2011 |
| JP | 2018-104819 A | 7/2018 |
| KR | 10-2015-0036428 A | 4/2015 |
| KR | 10-2016-0035094 A | 3/2016 |
| KR | 10-2018-0051760 A | 5/2018 |
| KR | 10-2162203 B1 | 10/2020 |
| NL | 2021197 B1 | 1/2019 |

OTHER PUBLICATIONS

Office Action dated Jul. 22, 2019 in Korean Patent Application No. 10-2018-0095349 (with English translation).

Notice of Allowance dated Feb. 19, 2020 in U.S. Appl. No. 16/158,162.

Notice of Allowance dated Jul. 22, 2020 in U.S. Appl. No. 16/877,681.

Chinese Office Action dated Jun. 30, 2022, issued in corresponding Chinese Patent Application No. 201811485701.3 (with English translation).

Extended European Search Report dated Mar. 3, 2022, issued in correspondingEuropean Patent Application No. 201911014513.7.

* cited by examiner

I-I'

MULTILAYER CERAMIC ELECTRONIC COMPONENT

CROSS-REFERENCE TO RELATED APPLICATIONS

This application is a continuation of U.S. patent application Ser. No. 16/877,681 filed on May 19, 2020 which is a continuation of U.S. patent application Ser. No. 16/158,162 filed Oct. 11, 2018, now U.S. Pat. No. 10,692,654, which claims the benefit of priority to Korean Patent Application No. 10-2018-0095349 filed on Aug. 16, 2018 in the Korean Intellectual Property Office, the disclosures of each are incorporated herein by reference in their entirety.

BACKGROUND

1. Field

The present disclosure relates to a multilayer ceramic electronic component.

2. Description of Related Art

A multilayer capacitor, which is a type of multilayer ceramic electronic component, is a chip type condenser mounted on the printed circuit boards of various electronic products including display devices such as a liquid crystal display (LCD) and a plasma display panel (PDP), a computer, a smartphone, a cellular phone, or the like, and functions to charge or discharge electricity.

Such a multilayer capacitor may be used as a component of various electronic devices because of its small size, secured high capacity, and ease of mounting. With the recent miniaturization of components of electronic devices, there is growing demand for miniaturization and high capacity in multilayer capacitors.

In order to achieve miniaturization and high capacity in multilayer capacitors, technology capable of forming an internal electrode and a dielectric layer having a small thickness is necessary.

Generally, in order to form the internal electrode having the small thickness, it is necessary to use a metal powder particle that is finer than an existing powder particle. This is because the presence of 5 to 6 fine metal powder particles in the thickness direction of a thinly printed internal electrode may prevent a breakage phenomenon that may occur during a contraction process.

However, when a metal powder particle that is finer than an existing powder particle is used, since a contraction start temperature may be lowered, a difference in the contraction behavior of the internal electrode and a ceramic layer increases, which causes a problem in that the internal electrode agglomeration phenomenon and the internal electrode breakage phenomenon may be worsened during the contraction process.

SUMMARY

An aspect of the present disclosure may provide a small, high-capacity multilayer ceramic electronic component with high reliability by suppressing an electrode breakage phenomenon and an electrode aggregation phenomenon.

According to an aspect of the present disclosure, a multilayer ceramic electronic component may include a body including an internal electrode alternately arranged with a dielectric layer; and an external electrode disposed on the body and connected to the internal electrode, wherein the internal electrode includes a plurality of nickel (Ni) grains, and a composite layer including tin (Sn) and nickel (Ni) is disposed at a grain boundary of the nickel (Ni) grains.

According to another aspect of the present disclosure, a multilayer ceramic electronic component may include a body including an internal electrode alternately arranged with a dielectric layer; and an external electrode disposed on the body and connected to the internal electrode, wherein the internal electrode includes a plurality of nickel (Ni) grains, and a composite layer including tin (Sn) and nickel (Ni) is disposed at a grain boundary of the nickel (Ni) grains, wherein the dielectric layer includes a plurality of dielectric grains, wherein tin (Sn) is included at a grain boundary of the plurality of dielectric grains, wherein a portion of the plurality of dielectric grains have a core-shell structure, and wherein tin (Sn) is included in the shell.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
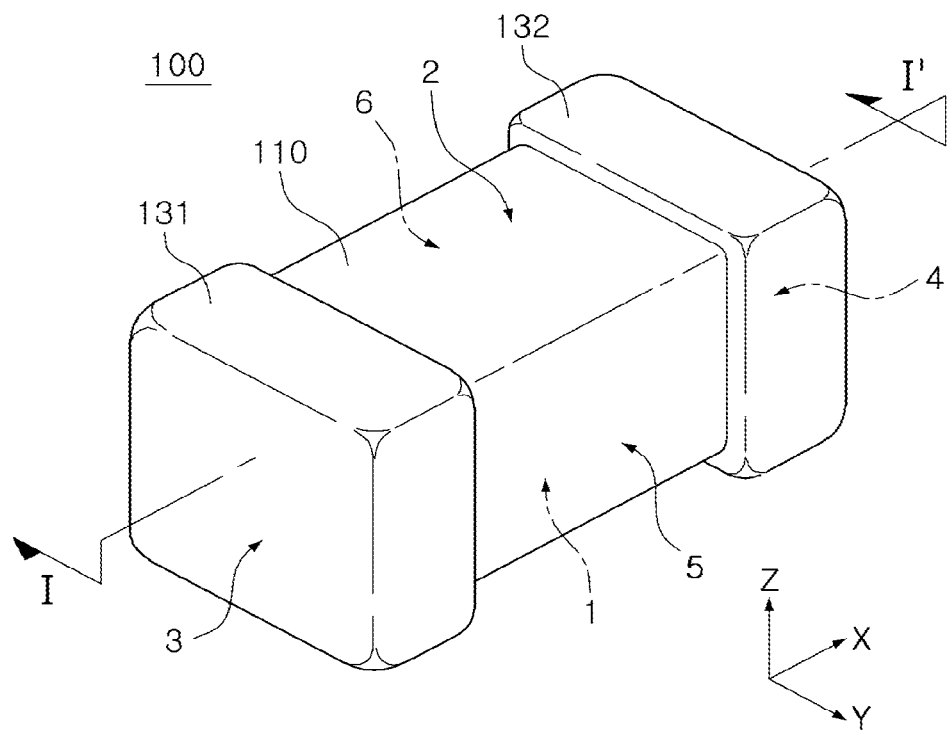
FIG. 1 is a perspective view schematically illustrating a multilayer ceramic electronic component according to an exemplary embodiment in the present disclosure.

Hereinafter, exemplary embodiments in the present disclosure will now be described in detail with reference to the accompanying drawings.

In the drawings, an X direction may be defined as a first direction, an L direction, or a longitudinal direction, a Y direction as a second direction, a W direction or a width direction, and a Z direction as a third direction, a T direction, or a thickness direction.

Multilayer Ceramic Electronic Component

FIG. 1 is a perspective view schematically illustrating a multilayer ceramic electronic component 100 according to an exemplary embodiment in the present disclosure.

Figure 2:
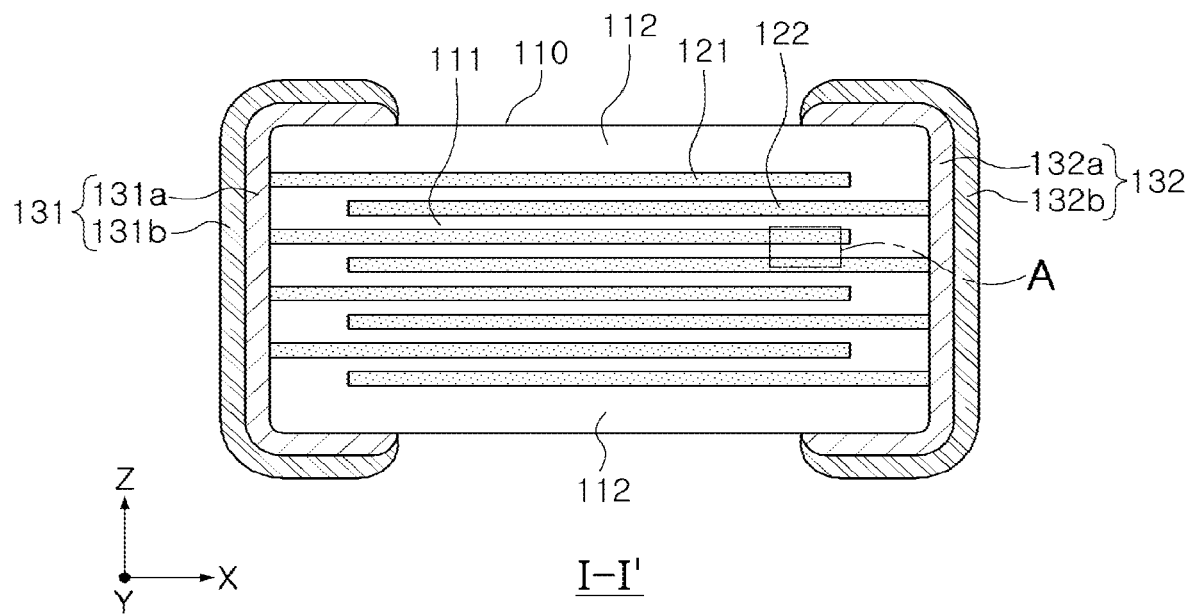
FIG. 2 is a cross-sectional view taken along line I-I' of FIG. 1.

FIG. 2 is a cross-sectional view taken along line I-I' of FIG. 1.

Figure 3A:
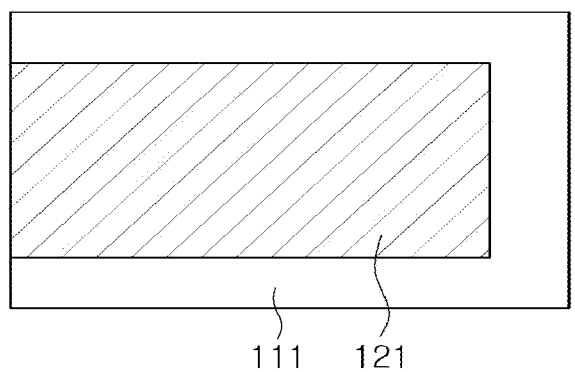
FIGS. 3A and 3B are views illustrating ceramic green sheets for manufacturing a multilayer ceramic electronic component according to an exemplary embodiment in the present disclosure.
Figure 3B:
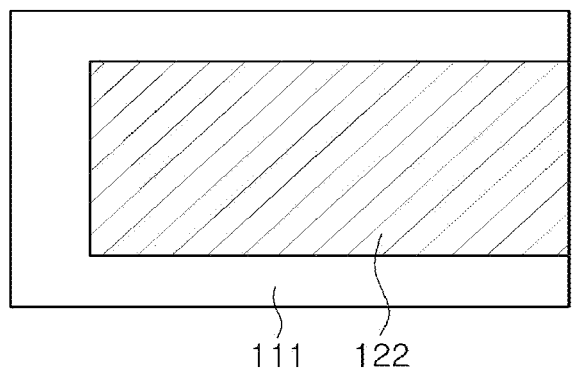

FIGS. 3A and 3B are views illustrating ceramic green sheets for manufacturing the multilayer ceramic electronic component 100 according to an exemplary embodiment in the present disclosure.

Figure 4:
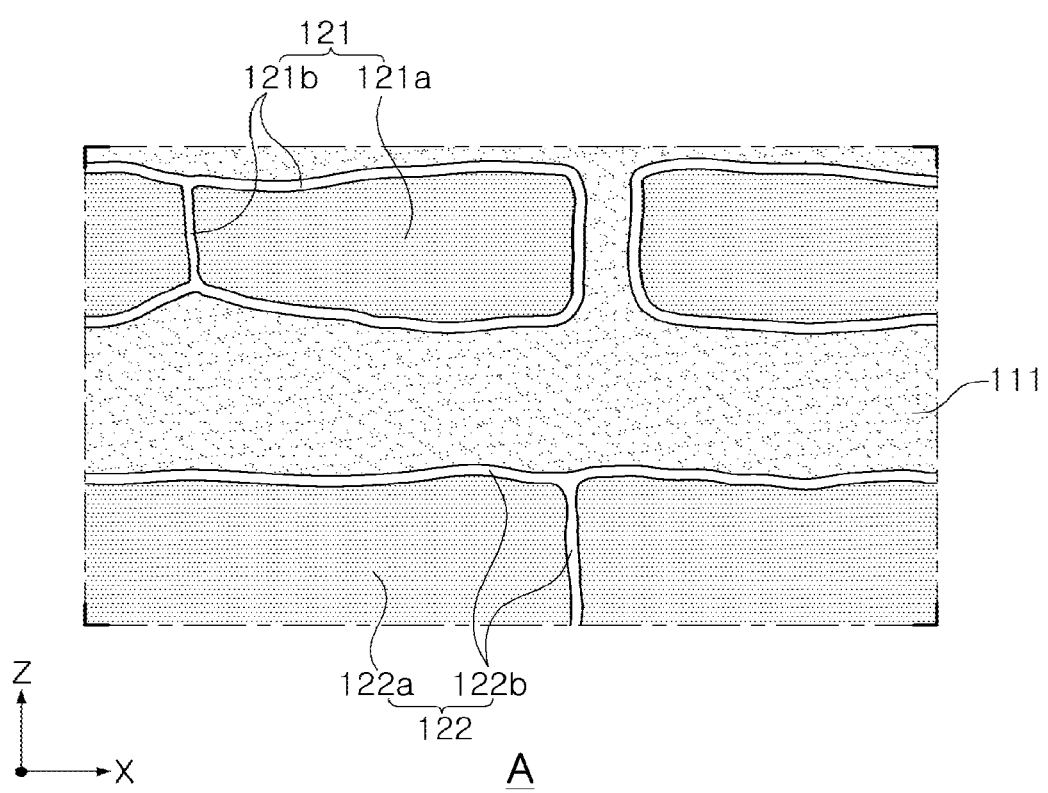
FIG. 4 is an enlarged view of portion A in FIG. 2.

FIG. 4 is an enlarged view of portion A in FIG. 2.

Figure 5:
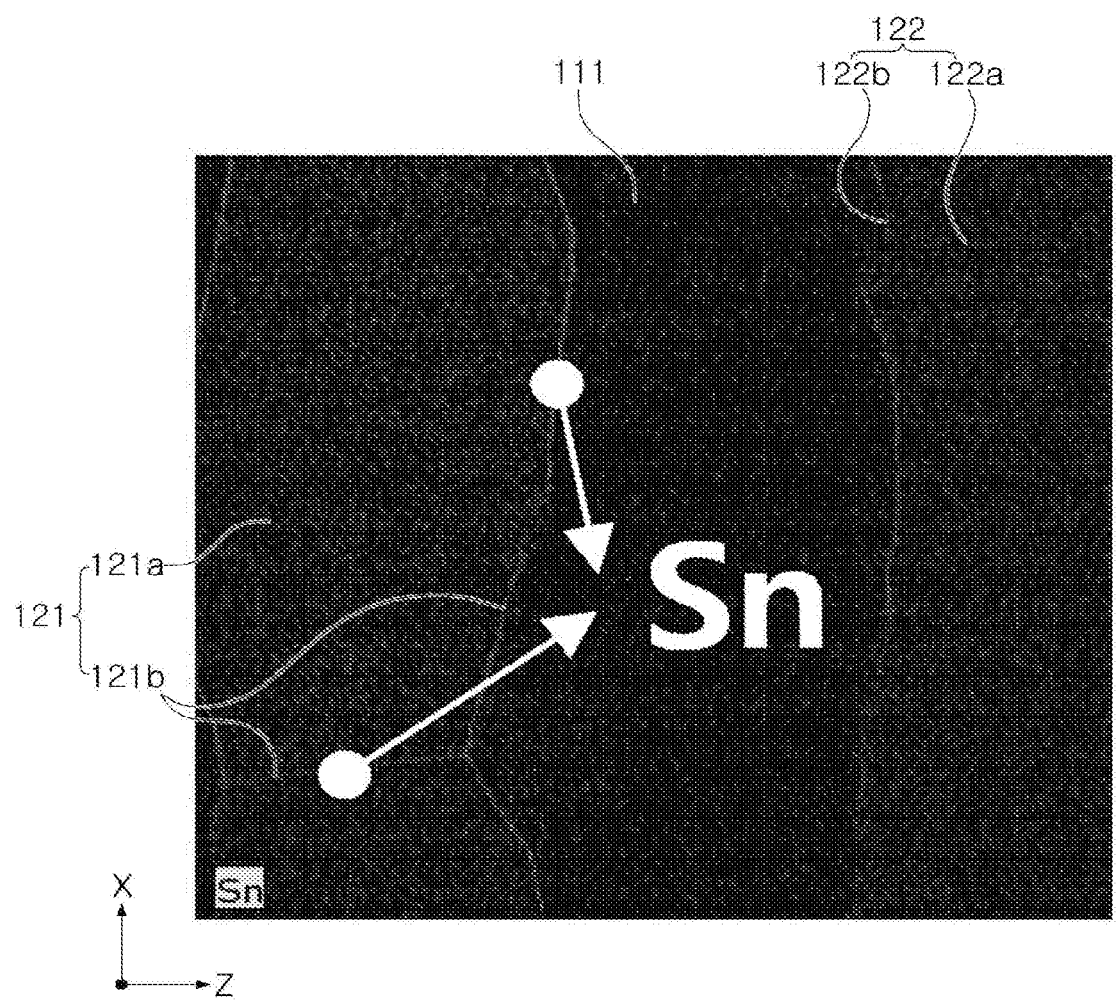
FIG. 5 is a photograph of internal electrodes and a dielectric layer of a multilayer ceramic electronic component according to an exemplary embodiment in the present disclosure.

FIG. 5 is a photograph of internal electrodes 121 and 122 and a dielectric layer 111 of the multilayer ceramic electronic component 100 according to an exemplary embodiment in the present disclosure.

Hereinafter, the multilayer ceramic electronic component 100 according to an exemplary embodiment in the present disclosure will be described in detail with reference to FIGS. 1 through 5.

The multilayer ceramic electronic component 100 according to an exemplary embodiment in the present disclosure includes a body 110 including the internal electrodes 121 and 122 alternately arranged with the dielectric layer 111; and external electrodes 131 and 132 disposed on the body 110 and connected to the internal electrodes 121 and 122. The internal electrodes 121 and 122 include a plurality of nickel (Ni) grains 121a. A composite layer 121b including tin (Sn) and nickel (Ni) is disposed on grain boundaries of the nickel (Ni) grains 121a.

The dielectric layer 111 and the internal electrodes 121 and 122 are alternately stacked in the body 110.

A specific shape of the body 110 is not particularly limited, but as shown, the body 110 may have a hexahedral shape or a similar shape. Due to contraction of the ceramic powder included in the body 110 during a sintering process, the body 110 may have a substantially hexahedral shape but not a hexahedral shape having completely straight lines.

The body 110 has first and second surfaces 1 and 2 opposing each other in a thickness direction (a Z direction), third and fourth surfaces 3 and 4 connected to the first and second surfaces 1 and 2 and opposing each other in a width direction (a Y direction), and fifth and sixth surfaces 5 and 6 connected to the first and second surfaces 1 and 2 and to the third and fourth surfaces 3 and 4 and opposing each other in a longitudinal direction (a Z direction).

The plurality of dielectric layers 111 forming the body 110 are in a sintered state. Boundaries between the adjacent dielectric layers 111 may be integrated so as to be difficult to confirm without using a scanning electron microscope (SEM).

A raw material forming the dielectric layer 111 is not particularly limited as long as sufficient electrostatic capacity is obtainable therewith. For example, the raw material may be barium titanate ($BaTiO_3$) powder. As the material forming the dielectric layer 111, various ceramic additives, organic solvents, plasticizers, binders, dispersants and the like may be added to powder such as barium titanate ($BaTiO_3$) according to the purpose of the present disclosure.

A cover layer 112 formed by stacking dielectric layers in which no internal electrode is formed may be provided on each of upper and lower portions of the body 110, i.e. both ends in the thickness direction (Z direction). The cover layer 112 may serve to maintain reliability of a capacitor against external impacts.

A thickness of the cover layer 112 is not particularly limited. However, the thickness of the cover layer 112 may be 20 μm or less in order to more easily achieve miniaturization and high capacity of the multilayer ceramic electronic component 100.

A thickness of the dielectric layer 111 is not particularly limited.

However, according to the present disclosure, even when thicknesses of the dielectric layer 111 and the internal electrodes 121 and 122 are very small, since it is possible to effectively suppress an increase in the electrode breaking and aggregation, in order to more easily achieve the miniaturization and high capacity of the of the multilayer ceramic electronic component 100, the thickness of the dielectric layer 111 may be 0.4 μm or less.

The thickness of the dielectric layer 111 may mean an average thickness of the dielectric layer 111 disposed between the first and second internal electrodes 121 and 122.

The average thickness of the dielectric layer 111 may be measured by scanning an image of a cross section of the body 110 in the length-thickness direction (L-T) using a scanning electron microscope (SEM).

For example, with respect to an arbitrary dielectric layer extracted from an image obtained by scanning the cross section of the body 110 in the length-thickness direction (L-T), cut in the center in the width direction of the body 110 using a scanning electron microscope (SEM), an average value may be measured by measuring the thickness of the dielectric layer at 30 points at equidistant intervals in the longitudinal direction.

The 30 points at equidistant intervals may be measured by a capacitance forming portion, a region in which the first and second internal electrodes 121 and 122 overlap each other.

Next, the internal electrodes 121 and 122 are alternately stacked with the dielectric layer 111, and may include the first and second internal electrodes 121 and 122. The first and second internal electrodes 121 and 122 are alternately arranged to face each other with the dielectric layer 111 constituting the body 110 interposed therebetween and may be exposed to the third and fourth surfaces 3 and 4 of the body 110 respectively.

At this time, the first and second internal electrodes 121 and 122 may be electrically separated from each other by the dielectric layer 111 disposed in the middle thereof.

A printing method of a conductive paste may use a screen printing method or a gravure printing method, but the present disclosure is not limited thereto.

Referring to FIGS. 3A and 3B, the body 110 may be formed by alternately stacking and then sintering a ceramic green sheet 111 on which the first internal electrode 121 is printed and a ceramic green sheet 111 on which the second internal electrode 122 is printed.

Referring to FIG. 4, the internal electrodes 121 and 122 include a plurality of nickel (Ni) grains 121a and 122a, and composite layers 121b and 122b including tin (Sn) and nickel (Ni) are arranged in grain boundaries of the nickel (Ni) grains 121a and 122a.

Generally, in order to form an internal electrode having a small thickness, it is necessary to use a metal powder particle that is finer than an existing powder particle. This is because the presence of 5 to 6 fine metal powder particles in the thickness direction of a thinly printed internal electrode may suppress the breakage phenomenon during a contraction process.

However, when a metal powder particle that is finer than an existing powder particle is used, since a contraction start temperature is lowered, a difference in the contraction behavior of the internal electrode and a dielectric layer increases, which causes a problem in which the internal electrode agglomeration phenomenon and the internal electrode breakage phenomenon are worsened during the contraction process.

In the present disclosure, the composite layers 121b and 122b including tin (Sn) and nickel (Ni) are disposed in the grain boundaries of the nickel (Ni) grains 121a and 122a to suppress the internal electrode agglomeration phenomenon and the internal electrode breakage phenomenon, thereby providing the multilayer ceramic electronic component 100 including internal electrodes having a small thickness, with a small thickness deviation, and excellent connectivity.

The nickel (Ni) grains 121a and 122a are polyhedrons formed by regularly arranging nickel (Ni) atoms. The composite layers 121b and 122b including tin (Sn) and nickel (Ni) surround the nickel (Ni) grains 121a and 122a. The composite layers 121b and 122b including tin (Sn) and nickel (Ni) may enclose or substantially enclose the at least one nickel (Ni) grains 121a and 122a.

The composite layers 121b and 122b including tin (Sn) and nickel (Ni) suppress growth of the nickel (Ni) grains 121a and 122a to the outside and suppress a surface area reduction (sphericalization) of nickel due to an increase of a sintering temperature and serve to improve the internal electrode agglomeration phenomenon and the internal electrode breakage phenomenon.

FIG. 5 is a photograph showing a distribution of tin (Sn) relative to the internal electrodes 121 and 122 and the dielectric layer 111 of the multilayer ceramic electronic component 100 according to an exemplary embodiment in the present disclosure.

Referring to FIG. 5, it may be seen that the first and second internal electrodes 121 and 122 are disposed with the dielectric layer 111 therebetween and include the nickel (Ni) grains 121a and 122a, respectively, and the composite layers 121b and 122b including tin (Sn) and nickel (Ni) are arranged in the grain boundaries of the nickel (Ni) grains 121a and 122a.

When a ratio of a length of a portion where an actual internal electrode is formed relative to the total length of the internal electrodes 121 and 122 is defined as a connectivity C of the internal electrodes 121 and 122, the composite layers 121b and 122b including tin (Sn) and nickel (Ni) may suppress the growth of the nickel (Ni) grains 121a and 122a to the outside and the surface area reduction (sphericalization) of nickel due to the increase of the sintering temperature, and thus the internal electrode 121 may satisfy 85% C.

Thicknesses of the composite layers 121b and 122b including tin (Sn) and nickel (Ni) may be within a range from 1 to 15 nm.

When the thicknesses of the composite layers 121b and 122b including tin (Sn) and nickel (Ni) are less than 1 nm, the composite layers 121b and 122b including tin (Sn) and nickel (Ni) are nickel (Ni) may not sufficiently suppress the growth of the nickel (Ni) grains 121a and 122a to the outside and the surface area reduction (sphericalization) of nickel due to the increase of the sintering temperature, and when the thickness exceeds 15 nm, since the thicknesses of the composite layers 121b and 122b including tin (Sn) and nickel (Ni) are not uniform, an effect of suppressing the growth of the nickel (Ni) grains 121a and 122a to the outside and the surface area reduction (sphericalization) of nickel due to the increase of the sintering temperature may deteriorate.

The composite layers 121b and 122b including tin (Sn) and nickel (Ni) may have a molar ratio of tin (Sn) of 0.0001 or more, based on a total content of the composite layers 121b and 122b.

Meanwhile, the thicknesses of the first and second internal electrodes 121 and 122 are not particularly limited.

However, according to the present disclosure, even when the thicknesses of the dielectric layer 111 and the internal electrodes 121 and 122 are very small, since it is possible to effectively suppress an increase in the electrode breakage and aggregation, in order to more easily achieve the miniaturization and implement high capacitance in the of the multilayer ceramic electronic component 100, the thicknesses of the first and second internal electrodes 121 and 122 may be 0.4 µm or less.

The thickness of the first and second internal electrodes 121 and 122 may mean an average thickness of the first and second internal electrodes 121 and 122.

The average thickness of the first and second internal electrodes 121 and 122 may be measured by scanning an image of a cross section of the body 110 in the length-thickness direction (L-T) using a scanning electron microscope (SEM).

For example, with respect to the arbitrary first and second internal electrodes 121 and 122 extracted from an image obtained by scanning the cross section of the body 110 in the length-thickness direction (L-T) cut in the center in the width direction of the body 110 using a scanning electron microscope (SEM), an average value may be measured by measuring the thickness of the first and second internal electrodes 121 and 122 at 30 points at equidistant intervals in the longitudinal direction.

The 30 points at equidistant intervals may be measured by a capacitance forming portion, a region in which the first and second internal electrodes 121 and 122 overlap each other.

The internal electrodes 121 and 122 may be formed of an internal electrode paste including nickel (Ni) powder. A coating layer including tin (Sn) may be formed on a surface of the internal electrode paste, or the nickel (Ni) powder of the internal electrode paste may include tin (Sn) in the form of an alloy. Whether the coating layer is used, or the nickel (Ni) powder includes tin (Sn), the tin (Sn) content may be 1.5 wt % or more, based on a total content of the nickel (Ni) powder.

When the coating layer including tin (Sn) or the nickel (Ni) powder including tin (Sn) in the form of the alloy is used, sintering may be delayed regardless of dispersion.

Also, an average particle diameter of the nickel (Ni) powder may be 100 nm or less. If the average particle diameter of the nickel (Ni) powder exceeds 100 nm, the thickness of the internal electrode may be larger.

Also, the internal electrode paste may further include sulfur (S) in a content of 300 ppm (excluding 0) or less, based on a total content of the nickel (Ni) powder.

In general, although a conductive paste for forming the internal electrode may include sulfur (S), which is a contraction retarder, when the content thereof exceeds 300 ppm, there is a possibility that a composite layer including tin (Sn) and nickel (Ni) will be unevenly formed after firing.

The external electrodes 131 and 132 are disposed on the body 110 and connected to the internal electrodes 121 and 122, respectively. As shown in FIG. 2, the external electrodes 131 and 132 may include first and second external electrodes 131 and 132 connected to the first and second internal electrodes 121 and 122, respectively. Although in the present embodiment, the multilayer ceramic electronic component 100 has a structure including the two external electrodes 131 and 132, the number and shapes of the external electrodes 131 and 132 maybe changed according to the shapes of the internal electrodes 121 and 122 and other different purposes.

Meanwhile, the external electrodes 131 and 132 may be formed of any material having electrical conductivity such as metal or the like, and specific materials may be determined in consideration of electrical characteristics, structural stability, and the like, and further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

More specifically with respect to the electrode layers 131a and 132a, for example, the electrode layers 131a and 132a may be sintering electrodes including a conductive metal and glass, and the conductive metal may be Cu. Also, the electrode layers 131a and 132a may be resin-based electrodes including a plurality of metal particles and a conductive resin.

More specifically with respect to the plating layers 131b and 132b, for example, the plating layers 131b and 132b may be nickel (Ni) plating layers or tin (Sn) plating layers, may be in the form of sequentially forming nickel (Ni) plating layers and tin (Sn) plating layers on the electrode layers 131a and 132a, and may include a plurality of nickel (Ni) plating layers and/or a plurality of tin (Sn) plating layers.

The size of the multilayer ceramic electronic component 100 is not particularly limited.

However, in order to simultaneously achieve the miniaturization and higher capacity, since the stack number needs to be increase by forming the dielectric layer 111 and the internal electrodes 121 and 122 having the small thicknesses, the effect of suppressing the increase in the electrode breaking and aggregation according to the present disclosure may be more remarkable in the multilayer ceramic electronic component 100 of 0402 (0.4 mm×0.2 mm) size or less. Therefore, the length of the multilayer ceramic electronic component 100 may be 0.4 mm or less and the width thereof may be 0.2 mm or less.

Hereinafter, a multilayer ceramic electronic component according to another exemplary embodiment in the present disclosure will be described in detail. However, the same components as those of the multilayer ceramic electronic component 100 according to an exemplary embodiment in the present disclosure are omitted to avoid redundant descriptions.

The multilayer ceramic electronic component according to the present exemplary embodiment in the present disclosure includes the body 110 including the internal electrodes 121 and 122 alternately arranged with a dielectric layer 111'; and the external electrodes 131 and 132 disposed on the body 110 and connected to the internal electrodes 121 and 122 respectively, wherein the internal electrodes 121 and 122 include the plurality of nickel (Ni) grains 121a, and the composite layer 121b including tin (Sn) and nickel (Ni) is disposed at a grain boundary of the nickel (Ni) grains 121a, the dielectric layer 111' includes a plurality of dielectric grains 11 and 11', tin (Sn) is included at a grain boundary of the dielectric grains 11 and 11', a part 11' of the plurality of dielectric grains 11 and 11' has a core 11a'-shell 11b' structure, and tin (Sn) is included in the shell 11b'.

Figure 6:
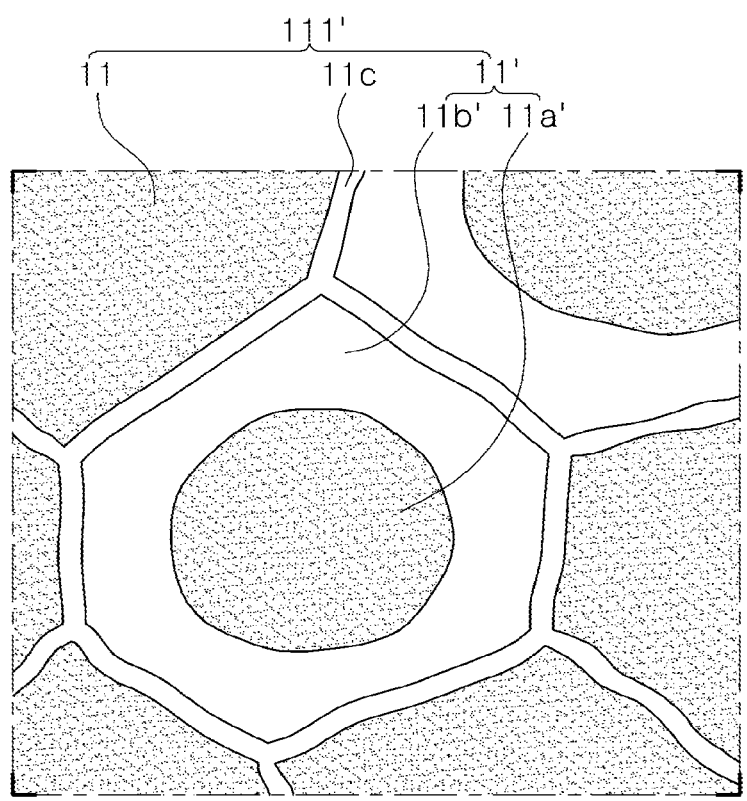
FIG. 6 is a schematic view schematically illustrating a dielectric layer of a multilayer ceramic electronic component according to another exemplary embodiment in the present disclosure.

FIG. 6 is a schematic view schematically illustrating the dielectric layer 111' of a multilayer ceramic electronic component according to the present exemplary embodiment in the present disclosure.

Figure 7:
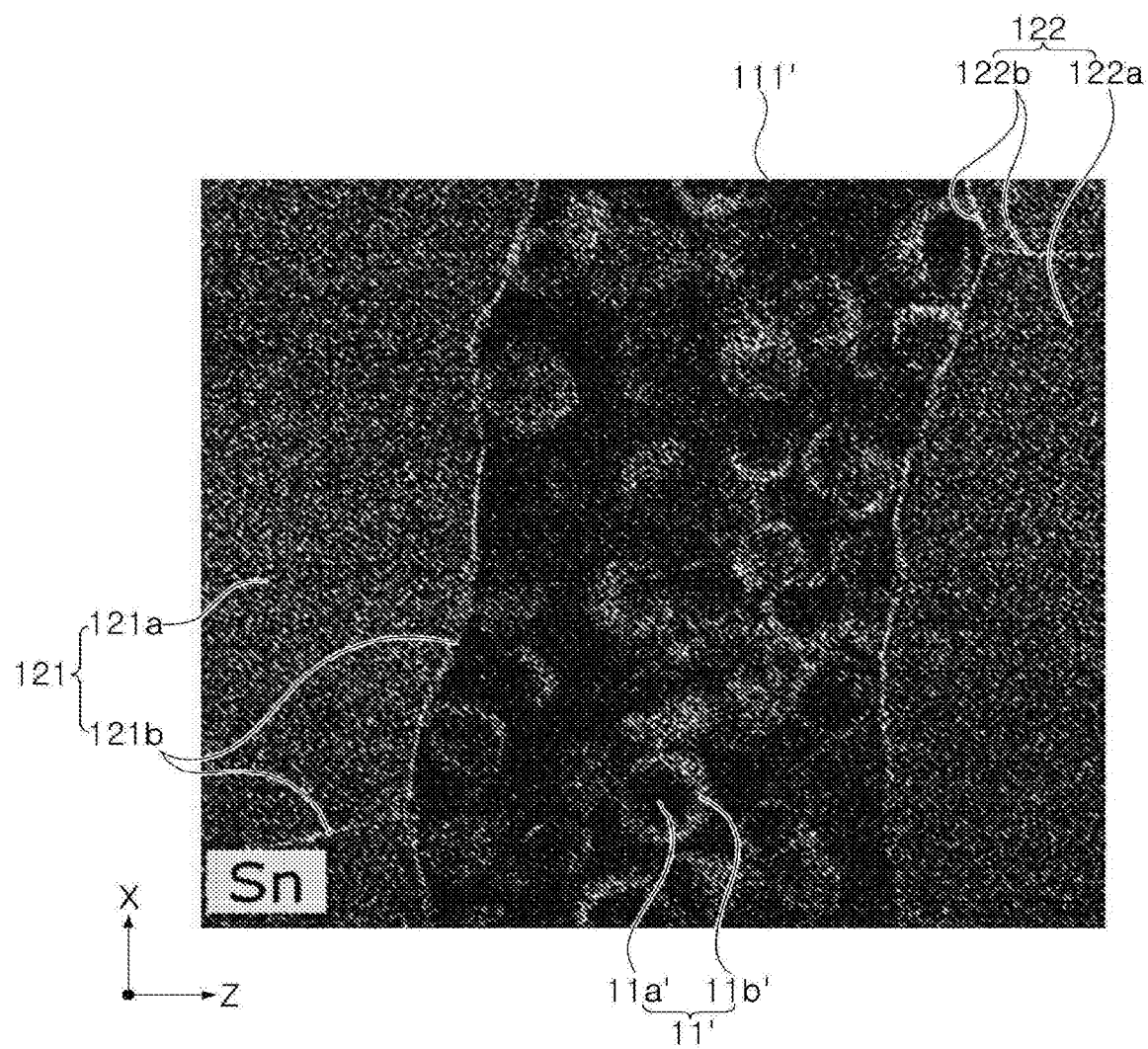
FIG. 7 is a photograph of internal electrodes and a dielectric layer of a multilayer ceramic electronic component according to another exemplary embodiment in the present disclosure.

FIG. 7 is a photograph of the internal electrodes 121 and 122 and the dielectric layer 111' of a multilayer ceramic electronic component according to the present exemplary embodiment in the present disclosure.

Referring to FIGS. 6 and 7, the dielectric layer 111' includes the plurality of dielectric grains 11 and 11', tin (Sn) is included at a grain boundary 11c of the dielectric grains 11 and 11', the part 11' of the plurality of dielectric grains 11 and 11' has a core 11a'-shell 11b' structure, and tin (Sn) is included in the shell 11b'.

Sn is contained in the grain boundary 11c and the shell 11b' of the dielectric grains 11 and 11', an excessive diffusion of an additive component may be suppressed, thereby suppressing a growth of the dielectric grains 11 and 11', and improving insulation resistance and withstand voltage characteristics.

Also, tin (Sn) is contained in the grain boundary 11c and the shell 11b' of the dielectric grains 11 and 11', thereby further enhancing an effect of the composite layers 121b and 122b including tin (Sn) and nickel (Ni) suppressing the growth of the nickel (Ni) grains 121a and 122a to the outside and a surface area reduction (spherical ization) of nickel due to an increase of a sintering temperature, and accordingly further improving the internal electrode agglomeration phenomenon and the internal electrode breakage phenomenon.

FIG. 7 is a photograph of the internal electrodes 121 and 122 and the dielectric layer 111' of the multilayer ceramic electronic component according to the present exemplary embodiment in the present disclosure.

Referring to FIG. 7, it may be seen that the first and second internal electrodes 121 and 122 are disposed with the dielectric layer 111' therebetween and include the nickel (Ni) grains 121a and 122a respectively, the composite layers 121b and 122b including tin (Sn) and nickel (Ni) are disposed in grain boundaries of the nickel (Ni) grains 121a and 122a, and tin (Sn) is included in the shell 11b'. However, since the grain boundary 11c of the dielectric grains 11 and 11' is thin, the grain boundary 11c is not clearly observed in FIG. 7.

A method of including tin (Sn) in the grain boundary 11c and the shell 11b' of the dielectric grains 11 and 11' is not particularly limited and may use, for example, a method of using a dielectric powder on which an tin (Sn) coating layer is formed on a surface thereof as a raw material of forming the dielectric layer 111', including an excessive amount of tin (Sn) as an additive, or increasing the tin (Sn) content included in an internal electrode conductive paste.

Meanwhile, among the plurality of dielectric grains 11 and 11', the dielectric grains 11' having the core 11a'-shell 11b' structure may be 20% or more of the entire dielectric grains 11 and 11', but is not limited thereto.

The shell may have a molar ratio of tin (Sn) of 0.0001 or more.

As set forth above, according to the exemplary embodiment in the present disclosure, since internal electrodes include a plurality of nickel (Ni) grains and composite layers including tin (Sn) and nickel (Ni) are disposed at a grain boundary of the nickel (Ni) grains, there is an effect of suppressing the internal electrode agglomeration phenomenon and the internal electrode breakage phenomenon.

While exemplary embodiments have been shown and described above, it will be apparent to those skilled in the art that modifications and variations could be made without departing from the scope in the present disclosure as defined by the appended claims.

What is claimed is:

1. A multilayer ceramic electronic component comprising:
a body including an internal electrode alternately arranged with a dielectric layer; and
an external electrode disposed on the body and connected to the internal electrode,
wherein the internal electrode includes a plurality of nickel (Ni) grains, and a composite layer including tin (Sn) and nickel (Ni) is disposed at an interface between the internal electrode and the dielectric layer, wherein, in the composite layer, a molar ratio of tin (Sn) is greater than or equal to 0.0001, based on a total content of the composite layer.

2. The multilayer ceramic electronic component of claim 1, wherein a thickness of the composite layer including tin (Sn) and nickel (Ni) is within a range from 1 to 15 nm.

3. The multilayer ceramic electronic component of claim 2, wherein an average thickness of the internal electrode is 0.4 μm or less.

4. The multilayer ceramic electronic component of claim 3, wherein an average thickness of the dielectric layer is 0.4 μm or less.

5. The multilayer ceramic electronic component of claim 4, wherein the body includes a capacitance forming portion including the internal electrode alternately arranged with the dielectric layer, and a cover layer disposed on each of upper and lower surfaces of the capacitance forming portion.

6. The multilayer ceramic electronic component of claim 5, wherein the thickness of the cover layer is 20 μm or less.

7. The multilayer ceramic electronic component of claim 6, wherein the multilayer ceramic electronic component has a length of 0.4 mm or less and a width of 0.2 mm or less.

8. The multilayer ceramic electronic component of claim 7, wherein 85%≤C, where C is a ratio of a length of a portion where an actual internal electrode is formed relative to a total length of the internal electrode.

9. The multilayer ceramic electronic component of claim 2, wherein an average thickness of the dielectric layer is 0.4 μm or less.

10. The multilayer ceramic electronic component of claim 9, wherein the body includes a capacitance forming portion including the internal electrode alternately arranged with the dielectric layer, and a cover layer disposed on each of upper and lower surfaces of the capacitance forming portion.

11. The multilayer ceramic electronic component of claim 10, wherein the thickness of the cover layer is 20 μm or less.

12. The multilayer ceramic electronic component of claim 11, wherein the multilayer ceramic electronic component has a length of 0.4 mm or less and a width of 0.2 mm or less.

13. The multilayer ceramic electronic component of claim 12, wherein 85%≤C, where C is a ratio of a length of a portion where an actual internal electrode is formed relative to a total length of the internal electrode.

14. A multilayer ceramic electronic component comprising:

a body including an internal electrode alternately arranged with a dielectric layer; and an external electrode disposed on the body and connected to the internal electrode, wherein the internal electrode includes a plurality of nickel (Ni) grains, and a composite layer including tin (Sn) and nickel (Ni) is disposed at an interface between the internal electrode and the dielectric layer, wherein the dielectric layer includes a plurality of dielectric grains, wherein tin (Sn) is included at a grain boundary of the plurality of dielectric grains, wherein a portion of the plurality of dielectric grains have a core-shell structure, wherein tin (Sn) is included in a shell of the dielectric grains having the core-shell structure, and wherein, in the composite layer, a molar ratio of tin (Sn) is greater than or equal to 0.0001, based on a total content of the composite layer.

15. The multilayer ceramic electronic component of claim 14, wherein a thickness of the composite layer including tin (Sn) and nickel (Ni) is within a range from 1 to 15 nm.

16. The multilayer ceramic electronic component of claim 15, wherein an average thickness of the internal electrode is 0.4 μm or less.

17. The multilayer ceramic electronic component of claim 16, wherein an average thickness of the dielectric layer is 0.4 μm or less.

18. The multilayer ceramic electronic component of claim 17, wherein the body includes a capacitance forming portion including the internal electrode alternately arranged with the dielectric layer, and a cover layer disposed on each of upper and lower surfaces of the capacitance forming portion.

19. The multilayer ceramic electronic component of claim 18, wherein the thickness of the cover layer is 20 μm or less.

20. The multilayer ceramic electronic component of claim 19, wherein the multilayer ceramic electronic component has a length of 0.4 mm or less and a width of 0.2 mm or less.

21. The multilayer ceramic electronic component of claim 20, wherein 85%≤C, where C is a ratio of a length of a portion where an actual internal electrode is formed relative to a total length of the internal electrode.

22. The multilayer ceramic electronic component of claim 14, wherein an average thickness of the internal electrode is 0.4 μm or less.

23. The multilayer ceramic electronic component of claim 22, wherein an average thickness of the dielectric layer is 0.4 μm or less.

24. The multilayer ceramic electronic component of claim 23, wherein the body includes a capacitance forming portion including the internal electrode alternately arranged with the dielectric layer, and a cover layer disposed on each of upper and lower surfaces of the capacitance forming portion.

25. The multilayer ceramic electronic component of claim 24, wherein the thickness of the cover layer is 20 μm or less.

26. The multilayer ceramic electronic component of claim 25, wherein the multilayer ceramic electronic component has a length of 0.4 mm or less and a width of 0.2 mm or less.

27. The multilayer ceramic electronic component of claim 26, wherein 85%≤C, where C is a ratio of a length of a portion where an actual internal electrode is formed relative to a total length of the internal electrode.

28. The multilayer ceramic electronic component of claim 14, wherein an average thickness of the dielectric layer is 0.4 μm or less.

29. The multilayer ceramic electronic component of claim 28, wherein the body includes a capacitance forming portion including the internal electrode alternately arranged with the dielectric layer, and a cover layer disposed on each of upper and lower surfaces of the capacitance forming portion.

30. The multilayer ceramic electronic component of claim 29, wherein the thickness of the cover layer is 20 μm or less.

31. The multilayer ceramic electronic component of claim 30, wherein the multilayer ceramic electronic component has a length of 0.4 mm or less and a width of 0.2 mm or less.

32. The multilayer ceramic electronic component of claim 31, wherein 85%≤C, where C is a ratio of a length of a portion where an actual internal electrode is formed relative to a total length of the internal electrode.

* * * * *